United States Patent [19]

Rao et al.

[11] 4,269,766

[45] * May 26, 1981

[54] METHOD AND APPARATUS FOR FRACTIONATING THE WHOLE WHEAT KERNEL BY SEQUENTIAL MILLING

[75] Inventors: Ganta V. Rao, Louisville, Ky.; Floyd K. Shoup, Hutchinson, Kans.

[73] Assignee: Far-Mar-Co., Inc., Hutchinson, Kans.

[ * ] Notice: The portion of the term of this patent subsequent to May 6, 1997, has been disclaimed.

[21] Appl. No.: 109,216

[22] Filed: Feb. 20, 1980

Related U.S. Application Data

[63] Continuation-in-part of Ser. No. 910,633, May 30, 1978, Pat. No. 4,201,708, which is a continuation of Ser. No. 831,905, Sep. 9, 1977, abandoned.

[51] Int. Cl.³ ............................................. A23J 1/12
[52] U.S. Cl. ............................. 260/112 G; 426/436; 426/479; 426/484; 426/518
[58] Field of Search .................. 260/112 G; 426/436, 426/518

[56] References Cited

U.S. PATENT DOCUMENTS

| | | | |
|---|---|---|---|
| 3,788,861 | 1/1974 | Durst | 426/385 |
| 3,790,553 | 2/1974 | Rao et al. | 260/112 G |
| 3,851,085 | 11/1974 | Rodgers et al. | 260/112 G X |
| 3,857,987 | 12/1974 | RoGols et al. | 260/112 G X |
| 3,891,613 | 6/1975 | Rao et al. | 260/112 G |
| 3,958,016 | 5/1976 | Galle et al. | 426/627 X |
| 3,979,375 | 9/1976 | Rao et al. | 260/112 G |
| 4,125,528 | 11/1978 | Rao et al. | 260/112 G |
| 4,201,708 | 5/1980 | Rao et al. | 260/112 G |

*Primary Examiner*—Howard E. Schain
*Attorney, Agent, or Firm*—Sixbey, Friedman & Leedom

[57] ABSTRACT

A process for fractionating the whole wheat kernel into its gluten, starch and bran-germ components including the steps of tempering the whole wheat kernel in water to increase its moisture content, flaking the tempered wheat kernel, disintegrating the flakes to a particle size range such that 20% to 90% of the particles will be retained on a 30 mesh U.S. Standard screen and in a manner that the resulting bran-germ particles are larger than the resulting endosperm particles, hydrating and agitating the kernel particles to just saturate them and to form a thick, dough-like mass and subjecting the mass to tumbling and/or manipulation together with water washing to separate and recover the gluten, starch and bran-germ components of the kernel.

19 Claims, 2 Drawing Figures

METHOD AND APPARATUS FOR FRACTIONATING THE WHOLE WHEAT KERNEL BY SEQUENTIAL MILLING

CROSS REFERENCE TO RELATED APPLICATIONS

This is a continuation-in-part of copending U.S. application Ser. No. 910,633, filed May 30, 1978, now U.S. Pat. No. 4,201,708, issued May 6, 1980, which, in turn, is a continuation of U.S. application Ser. No. 831,905, filed Sept. 9, 1977, now abandoned.

BACKGROUND OF THE INVENTION

1. Field of the Invention

The present invention relates to the separation of vital wheat gluten and starch and, more particularly, to a wet process for fractionating vital wheat gluten, starch and bran-germ from the whole wheat kernel with minimum damage to the functional, chemical and biological characteristics of the wheat kernel components.

2. Description of the Prior Art

The milling of wheat can basically be divided into two categories: (1) dry milling and (2) wet milling with aqueous solvents. Dry milling of wheat is a familiar process which produces patent wheat flour, second clears (lower quality flour), various other low grade flour products, bran, and germ. The products designated as flour are those obtained from the endosperm which contains the wheat starch and gluten. It is not presently possible to efficiently separate the starch and gluten contained in the endosperm by dry milling techniques.

The commercial production of vital wheat gluten and the separation of starch therefrom has been accomplished in the past by wet milling techniques using wheat flour or second clears (a small fraction of the flour stream) as the starting material by the "dough ball" process and modifications thereof, which processes essentially separate the wheat starch from the gluten protein. In one process, the gluten is maintained as a single coherent mass and the starch is washed out of a flour and water dough. Another process disperses the dough in water and recovers the gluten particles on a screen. Variations of the basic dough ball process utilizing wheat flour account for a major part of the vital gluten produced commercially today. Until recently, no known gluten production process employed the whole wheat kernel as the starting material. This was probably because production of vital wheat gluten is a comparatively recent innovation which developed from starch recovery processes. Early starch recovery processes utilized the whole wheat kernel but could not be converted to gluten production because the process conditions were too harsh and destroyed or devitalized the gluten. On the other hand, dough ball or batter processing from wheat flour was relatively simple because the bran and the germ had been substantially removed in the milling process. In addition, high ash second clears worked well in the dough ball process and were available at attractive prices as a by-product of the flour milling industry. Consequently, wheat gluten processing had been flour oriented for decades and no need had apparently existed to motivate the development of a process starting from the whole wheat kernel. However, improvements in milling techniques coupled with a drastic decline in the number of operative flour mills has led to current shortages of and higher prices for clears. As a result, millions of pounds of vital wheat gluten are imported by the United States each year to meet demands domestic producers cannot fill.

Processes for vital wheat gluten-starch separation and gluten recovery which utilize the whole wheat kernel as the starting material are taught in U.S. Pat. No. 3,891,613 and U.S. Pat. No. 3,979,375. According to these processes the whole wheat kernel is tempered in water and impact milled or flaked. The resulting particles or flakes are thereafter hydrated to saturation to form a thick, dough-like mass and mechanically worked in the presence of water to wash the wheat kernel components from the gluten. Other patents which disclose wet milling fractionation of the whole wheat kernel include U.S. Pat. Nos. 3,790,553, 3,788,861, 3,832,472, 3,851,085, 3,857,987, 3,868,355 and 3,958,016.

Complete dough hydration as a preliminary to component fractionation is taught in all these patents and has always been considered an essential element in the effective separation and recovery of high quality wheat components in high yields. The better the hydration, it has been found, the better are the yields of the wheat endosperm components, starch and gluten. Therefore, it has been a goal of wet milling processes to improve the rate and extent of hydration to improve these yields. However, efforts to improve hydration to increase yields, e.g., by reducing particle sizes, are generally inconsistent and at cross purposes with efforts to improve the quality of the fractions and to separate and recover bran-germ.

SUMMARY OF THE INVENTION

It is therefore an object of the present invention to provide a vital wheat gluten, starch, bran-germ fractionation process which utilizes the whole wheat kernel as the starting material and which produces higher yields of and higher quality wheat fractions than presently practiced processes.

It is another object of the invention to provide a whole wheat kernel fractionation process which employs special milling procedures to maximize endosperm exposure for hydration yet which controls particle size to permit the economical separation of bran-germ from the other fractions and the recovery of bran-germ in high yields.

Other objects and advantages will become apparent from the following description and appended claims.

Briefly stated, in accordance with the aforesaid objects, the present invention provides a process for fractionating the whole wheat kernel, and, particularly, for separating wheat gluten from the other components of the whole wheat kernal for recovery of high quality gluten, starch and bran-germ with minimum damage to the physical, chemical and biological properties of the kernel components. According, to the process, as can be seen in FIG. 1, the whole wheat kernel is tempered in water to increase its moisture content to at least 14% by weight and then flake milled to reduce the particle sizes of the kernel components. The flakes are disintegrated by further milling, e.g., in a hammer or pin mill, to component particle sizes which are conducive to rapid and complete hydration of the endosperm and to effective and substantially complete component separation and recovery. The disintegrated flakes, comprising endosperm as well as bran-germ components, are hydrated to form a dough in a limited quantity of water just sufficient to achieve saturation. In a preferred form of the invention, the hydrated dough is processed in an initial separation step to remove a major proportion of the starch therefrom in a dough washer wherein the dough is subjected to very mild mechanical manipulation while being continuously washed by a high pressure water spray. The resulting mass, comprising primarily gluten and bran-germ, is then subjected in a secondary separation step to further purification to separate the bran-germ particles and any residual starch from the gluten. This secondary separation is preferably accomplished in a gluten washer wherein mechanical manipulation of the primarily gluten mass is combined with water washing. The starch slurry recovered from the primary and secondary separation steps is processed by conventional techniques well known in the art for purification of the starch. Likewise, the bran-germ is recovered and purified by conventional techniques.

It has been found that complete and uniform hydration of the dough is the most critical factor in obtaining improved fractionation and higher yields of each of the components. Completeness and uniformity of hydration is achieved, in accordance with the present invention, by careful control of the whole wheat kernel milling and, specifically, by utilizing a two step milling procedure in which the kernel is first flaked and then the flakes are disintegrated by well known milling techniques, preferably to a particle size whereby 20 to 90% by weight of the particles are retained on a 30 mesh screen. Unless otherwise stated, screen sizes referred to throughout correspond to U.S. Standard screen size designations. The two step milling procedure minimizes starch damage while at the same time maximizes endosperm exposure for hydration and maintains the bran-germ particles in a size range which permits their efficient, economical and substantially complete separation from the gluten and starch components of the kernel.

BRIEF DESCRIPTION OF THE DRAWINGS

The invention will be better understood from the following description taken in conjunction with the accompanying drawings.

DETAILED DESCRIPTION OF THE INVENTION

Figure 1:
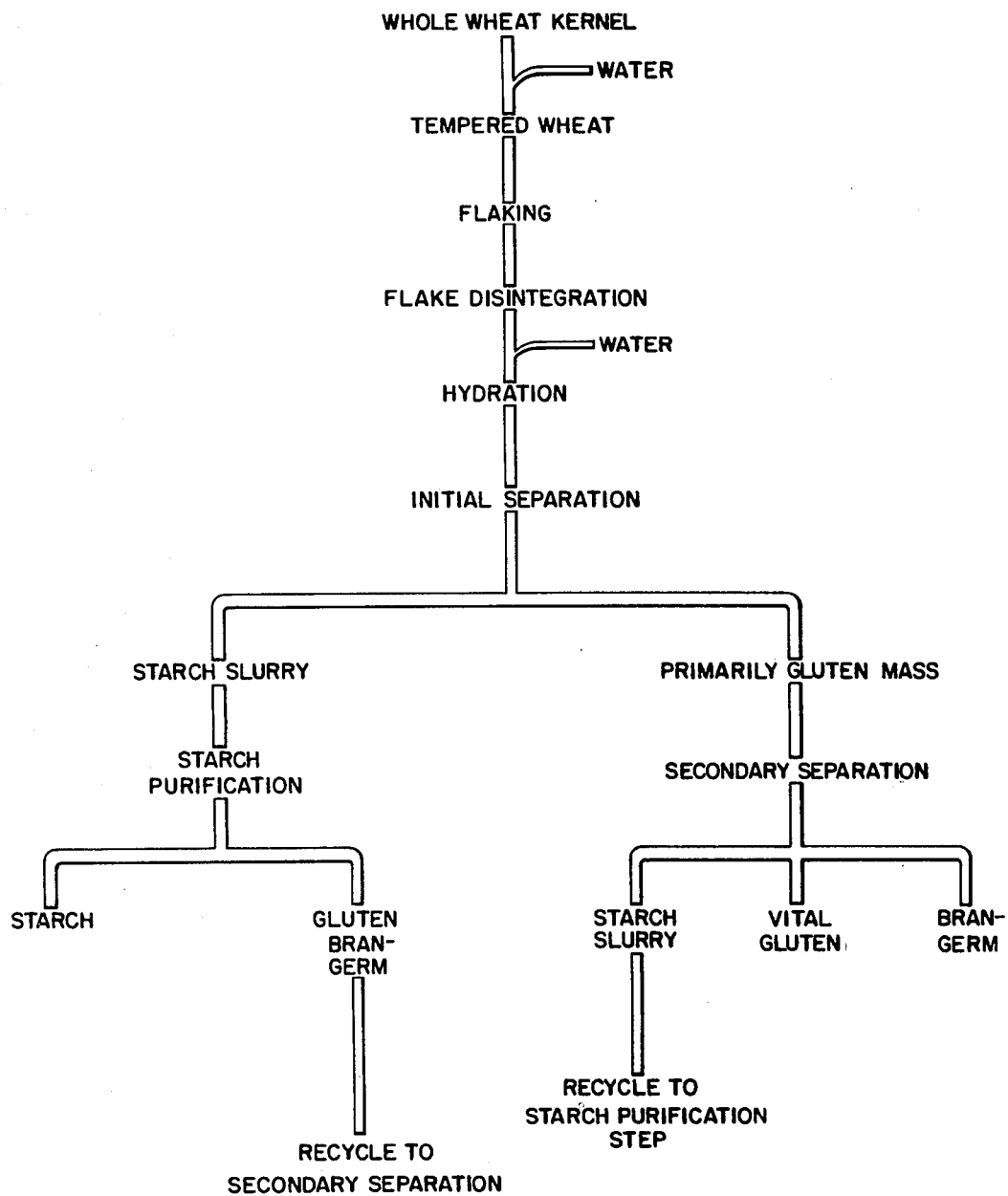
FIG. 1 is a block flow diagram of a preferred form of the present invention.

The present invention is directed primarily to fractionation of the whole wheat kernel into its major components and, particularly, to the separation of vital wheat gluten therefrom instead of from wheat flour, as is presently the predominant practice. It will be appreciated, however, that a process which can fractionate the whole wheat kernel can also utilize, if desired, wheat flour as the starting material. Inasmuch as wheat flour already has the bran and germ removed it is far more difficult to fractionate the whole wheat kernel to recover the components therefrom than to fractionate wheat flour alone. Aside from considerations of availability, there are a number of distinct advantages incident to starting from the whole wheat kernel. Essentially all of the gluten in the wheat is recoverable from the whole wheat kernel, while processing of wheat flour, by its nature, can recover only the gluten in the by-product clears. Moreover, the whole wheat kernel offers a stable supply of raw material with dependable and predictable physical and chemical characteristics. On the other hand, wheat flour is a by-product of differing milling techniques and is neither a uniform nor a stable raw material. In addition, processing the whole wheat kernel produces a greater yield of high quality gluten per bushel of wheat processed.

The first step of the present process comprises tempering the whole wheat kernel in water with intermittent mixing to achieve a kernel moisture content in the range, by weight, from about 14% to saturation. Unprocessed whole wheat kernels have a moisture content generally in the range from about 9.0 to 14%. The saturation moisture content depends upon the characteristics of the kernel and, at room temperature, is generally in the range from about 45 to 55% by weight. Tempering in accordance with the present process involves contacting with or immersing the kernels in water, preferably with mixing, for a period of time sufficient to allow the kernels to take-up the necessary water to reach the desired moisture content. In one form, the kernels are contacted with water and mixed and then moved to a tempering tank where they remain in contact with the tempering water for a time sufficient for them to reach the desired moisture content. It is preferred, although not required, to temper the kernels in precisely the amount of water necessary to reach the desired water content. This avoids loss of water soluble protein to the tempering water. Tempering is a relatively slow process, it having been found, for example, that contacting the kernels with water at room temperature, i.e. about 68° F., requires about 2–12 hours, usually about 8 hours, to reach an optimum moisture content. However, the tempering rate can be increased by heating. If the tempering solution is heated, care must be exercised to maintain the temperature below a value where the gluten may become damaged. Indeed, since an object of the process is to produce vital wheat gluten as a most important whole wheat kernel fraction, each step of the process should be conducted below the temperature at which the gluten may become damaged. Gluten damage will occur at about 140° F., or, after prolonged heating, at temperatures above 120° F. Therefore, tempering is most advantageously conducted in the temperature range from room temperature up to about 120° F.

Tempering is preferably employed in one embodiment of the present process to increase the moisture content of the kernel to no more than about 22% water by weight, although tempering to about 14–18% moisture has been found to be optimum in terms of minimizing starch damage and maximizing endosperm yields following milling. If the moisture content of the kernel is increased beyond 22% by weight at this early stage of the processing, the possibility of microbial growth is substantially enhanced. Accordingly, tempering to the range 15–17% is particularly advantageous.

Increasing the whole wheat kernel moisture content to at least about 14% is necessary as a preliminary to milling in processes wherein it is desired to start with the whole wheat kernel and to separate and recover the starch, gluten and bran-germ components therefrom. Unless the kernel moisture content is at least 14% prior to milling the germ and starch will be damaged during particle size reduction. Moreover, the present process is fundamentally a whole wheat kernel component fractionation process. As such, it is particularly desirable to maintain the bran as intact as possible, i.e., to avoid shattering the bran, since in subsequent steps the bran-germ particles will be separated from the endosperm components of the whole wheat kernel. Another reason that relatively large bran-germ particles are desired is that following hydration, and upon drying, the large bran particles appear to act as an encapsulating agent for the germ with the effect that the germ shelf life is increased. Moisture content increase to at least 14% ensures that the bran remains reasonably plastic and, therefore, is ground to a lesser degree than the endosperm during milling.

In accordance with the present invention the method employed for milling the tempered wheat kernel is designed to minimize starch and bran-germ damage, maximize endosperm exposure for subsequent hydration and facilitate the efficient, economical and substantially complete separation of bran-germ particles from the gluten and starch components of the kernel. The milling procedure is two stage and comprises, in the first stage, flaking the kernel, and, in the second stage, disintegrating the flakes in a controlled manner, preferably to a predetermined particle size range.

Flaking may be accomplished in a conventional roller mill having clearances from 0.001 to 0.05 inch. While the ultimate particle size resulting from the flaking is immaterial, it has been found that flakes having thicknesses from 0.0005 to 0.025 inches may be satisfactorily processed in accordance with the present process. Flaking is a well known processing step and, as used herein, contemplates processing in commercially available equipment, such as roller mills, under conditions known to be conducive to flaking. It has been found that the use of smooth rolls, rather than corrugated or fluted rolls, is most desirable from the standpoint of flake thickness and minimizing starch damage. Flaking is preferable to many other forms of tempered kernel milling, such as grinding in a hammer mill, because it has been found to be extremely difficult, as a practical matter, to subsequently remove the bran from the extremely small particles of ground wheat.

The flakes are subjected to a second milling operation which has as its purpose to increase endosperm exposure, i.e., to free the endosperm from the bran without reducing bran particle size to a point where subsequent separation of the bran particles will present a major problem. It is, of course, well known that following tempering of the kernel to at least a moisture content of 14% the endosperm particles are more brittle than the relatively plastic bran particles. As a result, during flake disintegration the endosperm is crushed or ground into relatively small particles while the more plastic bran is ground to a lesser degree. The flake disintegration procedure must strike an appropriate balance between the benefits of prolonged or intense milling, i.e., greater endosperm exposure for subsequent hydration, and the detriments of prolonged or intense milling, i.e., increased bran and starch damage and disintegration of the bran particles to an extent where their subsequent separation is extremely difficult. It has been found that this balance is best struck when the particles following flake disintegration have a preferred particle size distribution such that 20 to 90% by weight, preferably 30 to 70%, and most desirably 40 to 60%, of the particles are retained on a 30 mesh U.S. Standard screen.

Various type mills can achieve the particle size distribution range desired following flake disintegration. Exemplary of suitable mills are conventional hammer mills and conventional pin (impact) mills. Both hammer and pin mills are well known items of processing equipment and are generally commercially available. For example, hammer mills suitable for use in the present process are available from sources such as Jacobson Machine Works, W. W. Grinder Co. and Sprout Walden Co., Inc. Hammer mills are preferred because adjustment of their slot or screen size permits good control of the particle sizes resulting from flake disintegration. Moreover, experience indicates that hammer-mills produce particles having a greater size differential between endosperm and bran particles than seems attainable with pin mills. In addition, hammer mills require less maintenance than pin mills. Nevertheless, notwithstanding a preference for hammer mills, pin mills and other type grinding mills, when used in a manner which maximizes endosperm exposure while minimizing starch damage and excessive grinding of the bran particles, also disintegrate the flakes to produce a useful result. Pin mills suitable for use in the present process are available from Alpine American Corp. of Natick, Massachusetts under the registered trademarks Kolloplex and Contraplex.

Table I shows a typical particle size range distribution for whole wheat kernels which were initially tempered in room temperature water to a moisture content of 16-17% by weight and then milled by flaking in a roller mill and disintegrating the resulting flakes in a hammer mill.

TABLE I

| Screen Analysis of Kernel Following Flake Disintegration in a Hammer Mill | | | | | | | |
|---|---|---|---|---|---|---|---|
| | Screen Size (Mesh) | | | | | | |
| | + 10 | + 20 | + 30 | + 50 | + 60 | + 100 | − 100 |
| % by weight | 3.31 | 28.64 | 11.03 | 20.23 | 14.98 | 8.83 | 12.98 |

According to Table I, about 43% by weight of the kernel particles were retained on a 30 mesh screen and about 63% by weight of the particles were retained on a 50 mesh screen.

To demonstrate that both hammer milling and pin milling the flakes to disintegrate them results in preferentially reducing the size of the endosperm particles relative to the more plastic bran-germ particles, the bran-germ fraction from a typical sample of disintegrated flakes exiting (1) a hammer mill, and (2) a pin mill, was analyzed for particle size distribution. The results are shown in Table II.

TABLE II

| Screen Analysis of Bran-Germ Fraction Following Flake Disintegration | | | | | |
|---|---|---|---|---|---|
| | Screen Size (Mesh) | | | | |
| | + 10 | +25 | + 50 | + 100 | −100 |
| Pin Mill | 1.75 | 40.24 | 35.95 | 15.98 | 6.08 |
| Hammer Mill | 4.55 | 73.87 | 20.17 | 0.95 | 0.46 |

It is noteworthy from Table II that, with both mills, the great bulk of the bran-germ fraction was retained on a 50 mesh screen. Using a hammer mill, 98.59% of the bran-germ fraction was retained on the 50 mesh screen, demonstrating that virtually all of the bran-germ survived the milling procedure as relatively large particles. Using a pin mill, 77.94% of the bran-germ fraction was retained on the 50 mesh screen, demonstrating the greater tendency of a pin mill to preferentially, but undesirably, reduce the bran-germ particle size. This undesirable aspect of pin mill usage can be minimized by controlling mill speed. Excessive pin mill speed tends to overly reduce particle sizes and to unnecessarily damage starch particles.

Following milling the disintegrated kernel particles are hydrated and agitated to form a dough, i.e., to develop the constituent wheat gluten into a cohesive elastic mass. The hydrating water may vary in temperature between 34° F. and about 120° F., but preferably is in the range 70°–90° F. Hydration of the endosperm is an important step in the present process since it is control of the extent of hydration which allows effective and efficient gluten-starch separation. Unlike prior art processes which utilized wheat flour as a starting material and which intentionally hydrated the flour with excess water (i.e., excess beyond the amount needed to saturate the flour) to form a thin, slurry-like dough, it is important when effecting gluten-starch separation in the present process to hydrate with only limited quantities of water. In accordance with the present process, it is intended to hydrate the disintegrated kernel particles just sufficiently to achieve saturation, with the objective of forming a thick, dough-like mixture having no excess water, i.e., no water beyond that required to saturate the kernel particles. In this connection the words "just saturated" or the like are intended to describe the dough-like mass or mixture containing no excess water. The amount of water added to hydrate the particles is therefore very important. It has been observed that use of more than the hereinafter prescribed quantity of hydrating water forms a slimy slurry from which subsequent gluten-starch separation is largely ineffective.

It will be appreciated that the quantity of water necessary to reach a saturation moisture content will vary depending upon the moisture content of the endosperm as well as upon the saturation limit of the particular type of wheat. Thus, for endosperm particles which have moisture contents in the range 11 to 22% by weight, the amount of hydrating water necessary to just reach saturation varies from about 65 to 85% by weight of the particles to be hydrated. Addition of more than 85% water is to be avoided lest a thin slurry result from which component separation is inefficient. Less than 65% water will generally be insufficient to achieve saturation.

The hydration of gluten particles to form a cohesive dough from which wheat components can be fractionated has been well known in the art for many years and various techniques for hydration have been developed. Any technique which completely and uniformly hydrates the endosperm particles, without disproportionate absorption of hydrating water by the bran and without the presence of dry lumps and unhydrated portions which cause the gluten to fall apart during washing, is suitable for use in the present process. It has been found that complete hydration is a function of hydrating water quantity, mechanical manipulation and hydrating time. Consistently good hydration has been found to be attainable by a process wherein (a) sufficient hydrating water is added to the disintegrated flakes and the mixture is agitated to form a dough; (b) the dough is manipulated mechanically, i.e., kneaded, to break up lumps and to assure complete and uniform hydration; and (c) the hydrated dough, i.e., the particles associated with the hydrating water, is afforded sufficient time to become completely hydrated. As a general matter it requires only a brief period of time, less than about an hour, and generally from 10 to 30 minutes, to complete the hydration process. In practical application, complete hydration may be accomplished by agitating the disintegrated flakes and water in a mixer to form the dough, mechanically manipulating or kneading the dough using a ribbon or similar type rotating conveyor or auger operating in a trough through which the dough is conveyed, and placing the dough in a hydration tank where it is allowed to rest for a time sufficient to complete the hydration. The kneading and hydration time requirements need not be separately satisfied, i.e., kneading could continue for the entire hydration period. However, as a practical matter, the conveyor used for manipulating the dough would have to be excessively lengthy to operate for the entire hydration period. Therefore, for convenience, a hydration tank is employed following manipulation to provide the balance of the hydrating period necessary to assure complete hydration.

Separation of the resulting thick, dough-like mass into its gluten, starch and bran-germ components may be accomplished in many ways well known to the art if extremely high purity fractions and high yields of each fraction are not required. For example, it is known to treat the hydrated mass by mechanically working it while continuously spraying it with wash water. Typically, the washer consists of a perforated drum or perforated trough device having a spiral screw operating therein to convey the hydrated dough therethrough. The dough is continuously washed by water from high pressure spray nozzles disposed along the length of the trough to wash the starch from the gluten. The wash water-starch slurry is transferred away from the gluten through the perforations while the gluten remains in the drum or trough. Such a prior art device as has just been described gives good starch-gluten separation and may be used in the initial separation step of the preferred form of the present invention. However, such a device is not preferred for use because recent studies indicate that severe or rough mechanical manipulation at this early stage tends to cause disintegration of the gluten, resulting in decreased gluten yields, protein incorporation into the starch slurry, and difficulties in bran-germ purification. It, therefore, appears that maximum gluten yields are attainable from the hydrated dough by gentle tumbling and/or gentle manipulation of the dough in the presence of wash water.

The preferred apparatus for initial separation is apparatus which can separate a sufficient amount of starch from the hydrated doughy mass that the gluten will become coherent and stick together to form an elastic mass or agglomerate without need for excessively manipulating the mass. It is the formation of this coherent elastic mass which prevents losses in gluten yields. In a preferred embodiment, a multi-stage, generally two-stage, vibrating screen arrangement is employed to provide a tumbling action to the doughy mass. At the same time the doughy mass is continuously washed by water from high pressure spray nozzles disposed along the screens. The starch in the doughy mass is readily washed from the gluten in the vibrating screen in much the same manner as with dough washing devices used in the past in that the wash water-containing starch slurry drains through the screen openings into a holding tank for subsequent further purification and drying by conventional techniques well known to the art. The wash water may be at a temperature in the range 60° to 120° F., but is generally at a temperature in the range 60°–90° F., and preferably about 80°–85° F. If the wash water temperature exceeds about 90° F. the gluten becomes slimy and difficult to recover. At wash water temperatures below about 60° F. the gluten becomes tough.

The vital wheat gluten is retained on the screen after most of the starch has been washed therefrom and then is recovered for further processing. As the starch is washed from the doughy mass, the gluten tends to fiberize and to agglomerate to form coherent masses. This agglomeration prevents the gluten from also being washed through the screens with the starch slurry. The screen sizes are selected to have large enough openings to allow the starch slurry to pass therethrough but small enough openings to prevent the gluten agglomerates from passing through. Generally, the screens should be in the size range 20–50 mesh U.S. Standard screen. Where a two-stage sequential vibrating screen setup is used, one preferred arrangement has the first screen downstream of the hydrating tank sized at about 30 mesh and the second screen sized at about 20 mesh. The openings in the second screen can generally be larger than in the first screen because the gluten agglomerates are generally sufficiently large by the time they reach the second screen that the danger of their washing through the screen openings is reduced. The motion imparted to the screens to cause them to vibrate or oscillate may advantageously be rotary in nature to cause the dough to trace a generally circular path around the screen between its entry onto and its exit from the screen. This permits a longer residence time for the dough on each screen. In a particularly preferred form of dough washer, a modified screw conveyor is employed between the first and second screens, and optionally between sets of subsequent screens if such sets are employed, to cause limited mechanical manipulation of the partially washed dough in order to provide increased cohesiveness in the gluten. It has been found that by continually increasing the gluten cohesiveness throughout the washing step, the bran-germ and gluten component yields are improved.

Final purification of the gluten is preferably achieved by subjecting the hydrated gluten, now containing substantially less starch than before it was passed through the dough washer, to a further wash in a gluten washer wherein the gluten is mechanically manipulated while being subjected to a water wash to remove any remaining starch therefrom. There are many types of gluten washers which have been suggested for use for this purpose. However, since most gluten-starch separation has proceeded from a flour starting material, the washers have only had to contend with starch-gluten separation and not with the additional problem of bran-germ separation as well. Typicaly available and known gluten washers are largely ineffective and/or nortoriously inefficient in bran-germ separation and, therefore, it has been found that when such washers are used there is poor bran-germ fraction recovery and the gluten fraction contains relatively large quantities of fiber as undesirable impurities. For example, using such washers typically leads to vital gluten fractions containing 2.5 to 6.0% fiber whereas fiber contents of less than 1% are readily attainable and desired in accordance with the preferred practice of the present process. Nevertheless, if relatively high fiber content gluten is an acceptable fractionation product, or for processes employing flour or second clears as the starting material, or in processes such as are taught in U.S. Pat. No. 3,979,375 wherein bran-germ is removed prior to dough formation, most conventionally known and available gluten washers may be employed. In these conventional and typical gluten washers, mechanical manipulation of the gluten mass consists of continuous cutting and shredding, lifting and stretching of the gluten to thoroughly expose it to a countercurrent flow of wash water generally having a temperature in the range 60°–90° F. In one form of gluten washer, a continous spiral ribbon conveyor operates concentrically in a perforated trough to simultaneously cut, shred and transport the gluten mass along the length of the trough. The conveyor is supported from a concentric shaft which also includes radially extending, generally triangular paddles to scrape the gluten from the sides of the trough and to lift and move it from one side of the trough to the other. The paddles also stretch the gluten as it is conveyed through the trough to efficiently expose it to the wash water. As with the dough washer, the starch is washed through the perforations into a holding tank for subsequent further purification and drying by conventional techniques well known to the art. The purified gluten can then be recovered from the trough and dried.

When employing the whole wheat kernel as the starting material, in accordance with the present process, a primary objective of the secondary separation step is to separate bran-germ from vital wheat gluten. Another objective, of course, is to separate any remaining starch not removed during the initial separation step. One apparatus useful for this purpose is a stationary screening device having a slotted screen formed in a cycloid available under the tradename SWECO STA-SIEVE from Sweco, Inc. of Los Angeles, Calif. An apparatus preferred for use employs unique mechanical means for manipulation of the gluten mass combined with water washing to separate the bran-germ particles from the gluten and to wash away any residual starch. The wash water employed should be at a temperature below that at which the gluten will be damaged, i.e., always below about 140° F. and generally below 120° F., and is preferably in the range 60°–90° F. for the reasons previously discussed herein.

One gluten washer which has been shown to be very advantageous for use herein is disclosed in U.S. Pat. No. 3,981,738, the disclosure of which is hereby incorporated by reference. In its most fundamental form this device includes a foraminous elongated stator or housing of expanded metal in which is mounted for rotation a cylindrical shaft having a small diameter at one end and incrementally increasing in diameter toward its other end. Helical flights are set in a spiral configuration around and protruding outwardly from the cylindrical shaft. The outer surface of the cylindrical shaft comprises a plurality of peaked, elbow-shaped ridges or other mechanical roughening means to provide a rough surface to aid in efficient gluten kneading. As the gluten mass is advanced along and through the stator or housing by rotation of the helical flights the surface of the gluten is scraped or picked at, i.e., abraded, by the peaked ridges and the foraminous stator surface. This loosens particles of bran and germ and exposes the starch in the interior of the gluten mass to wash water in which the shaft is submerged or which is sprayed onto the shaft. The bran-germ and starch are forced through the stator openings and are collected for subsequent separation and further component purification by conventional techniques.

The gluten recovered from the process must be carefully dried to preserve its vitality. Inasmuch as a major problem incident to drying elastic vital gluten is in feeding the wet mass into a dryer at varying moisture levels, it may be desirable to dewater the gluten prior to drying. If such is the case, the gluten washing apparatus of U.S. Pat. No. 3,981,738, employed without the water washes, can be advantageously used for dewatering. Exemplary of the numerous suitable drying techniques are vacuum tray drying, flash drying, spray drying and extrusion drying.

Figure 2:
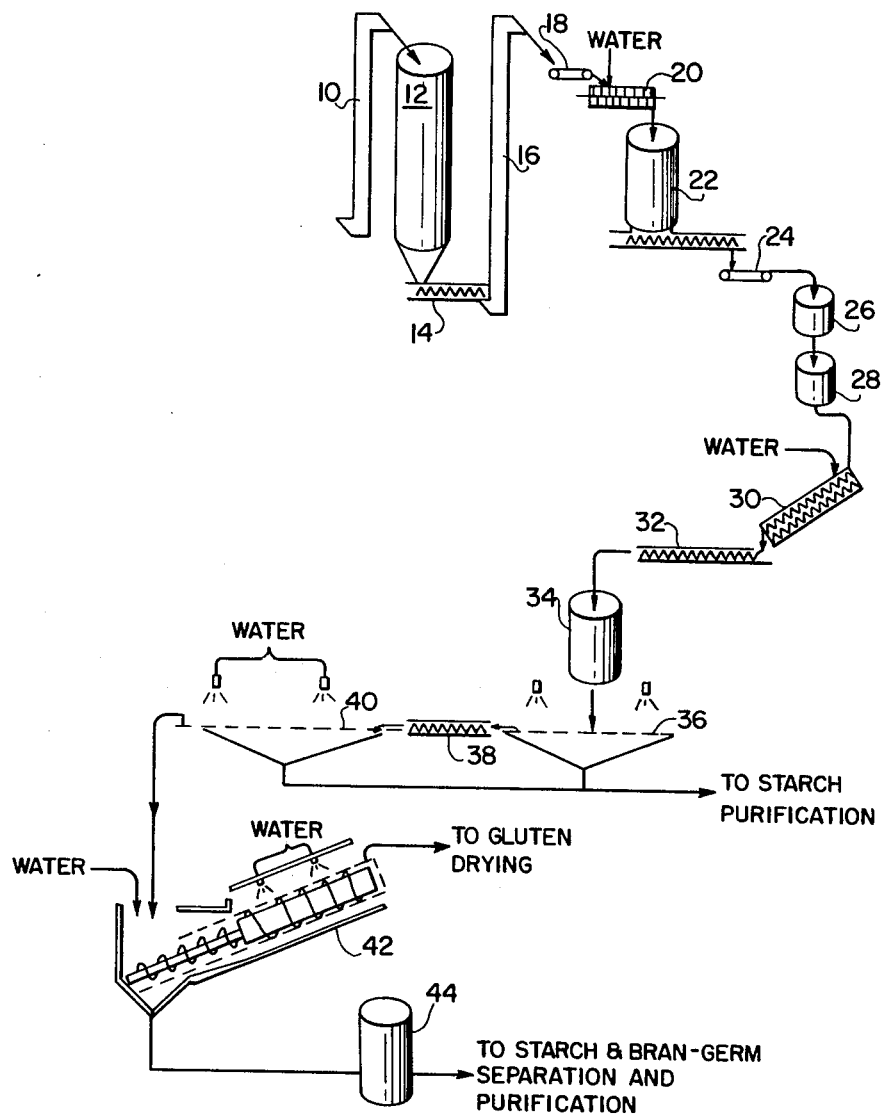
FIG. 2 is a flow diagram of a preferred form of the present process showing in a schematic manner the equipment used.

In the schematic representation of one preferred form of the present process, as shown in FIG. 2, the whole wheat kernels are received for processing and transported via a bucket elevator 10 to storage bin 12. When processing is to commence, the kernels from bin 12 are conveyed via a screw conveyor 14 and bucket elevator 16 to a gravimetric feeder 18 which meters the kernels through a blender 20 into a tempering tank 22. In the tank 22, the moisture content of the kernels is raised to the desired level after which the tempered kernels are metered through gravimetric feeder 24 into roller mill 26. In the mill, the kernel is flaked and the flakes pass into hammer mill 28 wherein they are disintegrated in such a mannner that the relative particle sizes of the resulting germ and bran particles are substantially greater than the particle sizes of the resulting endosperm particles. The ground endosperm and bran-germ particles pass from the hammer mill into a continuous dough mixer 30, where they are mixed with water to form a dough. The dough is kneaded to remove dry lumps and enhance hydration in ribbon conveyor 32 which drops the dough into the top of hydrating tank 34. In passing through the hydrating tank sufficient time is allowed to elapse to permit hydration of the dough to be completed. The hydrated doughy mass from tank 34 is directed next to a dough washer comprising a pair of vibrating screens 36 and 40 connected by a modified screw conveyor 38 to lend cohesiveness to the agglomerated gluten from the first screen. On the screens the dough is subjected to a continuous water spray while being gently tumbled. The starch is washed through the screen openings into a tank (not shown) for further purification while the resulting agglomerated gluten is subjected to further purification in gluten washer 42 to separate the bran-germ and any residual starch therefrom. In washer 42 the gluten mass is continuously manipulated to expose the starch therein and to separate bran-germ. A flow of wash water washes the starch and bran-germ through perforations in the washer into a tank 44 for subsequent separation of the starch from the bran-germ and for further purification of both. The gluten mass, containing a minimum of impurities is then dried for use.

The following Examples illustrate the practice of and serve to demonstrate the advantages and benefits of the present invention.

EXAMPLE I

Whole wheat kernels were cleaned, contacted with room temperature water and maintained in a tempering tank for about 8 hours. The average moisture content of the resulting kernels was 16.8%. Following tempering the kernels were milled in accordance with the prior art (U.S. Pat. No. 3,891,613) by flaking in a roller mill, using smooth rolls. The resulting flakes had an average thickness of about 0.001 inches. At this point the flakes were separated into three lots.

A first lot of the flakes was hydrated by agitating water in a Readco mixer to form a dough, the dough was kneaded in a ribbon conveyor and then dropped into a hydrating tank until the total hydration time was about 30 minutes. The hydrated dough was passed to a vibrating 30 mesh screen, to which a rotary motion was imparted, then via a modified screw conveyor to a vibrating 20 mesh screen to which a rotary motion was also imparted. Water sprays were directed at the doughy mass on the screens and the wash water, primarily comprising a starch slurry, passed through the screen openings and was collected. The agglomerated gluten mass leaving the second vibrating screen was passed to a gluten washer constructed and operated in accordance with U.S. Pat. No. 3,981,738. The bran-germ and starch in the wash water from the gluten washer was collected and the vital gluten was dewatered and dried. The starch slurry from the vibrating screens and from the bran-germ/starch slurry leaving the gluten washer was purified and dried using conventional starch purification techniques. The bran-germ separated from the gluten in the gluten washer was also purified and dried.

The recovered gluten, bran-germ and starch components were analyzed and suitable measurements taken to determine % yield of each component calculated as weight of the component based upon the weight of the starting wheat kernels, % protein in the bran-germ and % starch damage. The results are set forth in Table III.

EXAMPLE II

A second lot of the flakes from Example I were fed to a hammer mill having ¼ inch screen to disintegrate the flakes in accordance with the present process. The resulting disintegrated flake particles were then hydrated to form a dough, subjected to initial and secondary separation, and the recovered, dried components were analyzed and measured, all as in Example I. The results are set forth in Table III.

EXAMPle III

A third lot of the flakes from Example I were fed to a pin (impact) mill to disintegrate the flakes in accordance with the present process. The resulting disintegrated flake particles were then hydrated to form a dough, subjected to initial and secondary separation, and the recovered, dried components were analyzed and measured all as in Example I. The results are set forth in Table III.

TABLE III

| Milling | Gluten % Yield | Bran-Germ | | Starch | |
|---|---|---|---|---|---|
| | | % Yield | % Protein | % Yield | % Starch Damage |
| Flaking | 6.0–6.5 | 22–24 | 18–19.5 | 45–47.0 | 4.20 |
| Flaking plus flake disintegration in hammer mill | 8.0–8.5 | 17–19 | 14.5–16.0 | 50–52 | 4.15 |
| Flaking plus flake disintegration in pin mill | 8.2 | 18.5 | 15.8 | 51.9 | 5.2 |

The data set out in Table III clearly demonstrate the improved component yields attainable with the present process and confirm the importance of milling by flaking plus flake disintegration. As can be seen from the "% yield-gluten" column, the added step of flake disintegration prior to dough formation increases the gluten yields by about one-third based upon the yields attainable using flaking alone. This, it is believed, is attributable to the increased hydration of the endosperm which results when the flakes are disintegrated. The purity of the bran-germ also increases as a consequence of the additional step of flake disintegration. It can be seen from Table III that although the total quantity yield of the bran-germ fraction appears to decrease when flake disintegration is employed, the decrease is substantially completely attributable to a decrease in protein content of the bran-germ. This means that gluten protein, in which heretofore had been incorporated as an impurity in the bran-germ fraction, is now more efficient separated from the bran-germ and shows up as increased gluten yields in the gluted fraction. Thus, the recovered bran-germ is a purer fraction. It is believed that an explanation similar to that suggested for gluten yields applies to the "% yield-Starch" column as well, i.e. the increased yields are attributable to the increased endosperm hydration resulting from flake disintegration. In this connection it is noteworthy that the additional milling step does not substantially increase the damage to the starch as might have been anticipated. Indeed, the "% starch damage" data is of the same magnitude as the starch damage which might be expected without the additional flake disintegration step (see, e.g., U.S. Pat. No. 3,979,375, FIG. 4 and Example IV hereof).

EXAMPLE IV

Whole wheat kernels were cleaned, divided into two lots and tempered in room temperature water until the average kernel moisture content reached 15% by weight (Lot 1) and 20% by weight (Lot 2). Each lot of tempered kernels was divided into two portions. One portion was flaked in a conventional, smooth roll roller mill, divided into a number of parts and each part eight pin milled at a selected mill speed in an Alpin mill or hammer milled. The other portion was divided into a number of parts and each part either pin milled or hammer milled without first flaking. Following milling or flaking plus milling each part was separately sieved to determine particle size distribution in terms of percent by weight retained on a 30 mesh U.S. Standard screen and then analyzed for % starch damage. The results are set forth in Table IV.

TABLE IV

| Moisture Content % by wt. | Milling | | | % by wt. retained 30 Mesh | % Starch Damage |
| --- | --- | --- | --- | --- | --- |
| | Flake | pin | Hammer | | |
| 15 | X | X* | | 18 | 5.58 |
| 20 | X | X* | | 25 | 4.31 |
| 15 | | X* | | 22 | 4.0 |
| 20 | | X* | | 23 | 3.8 |
| 15 | X | X** | | 26 | 4.09 |
| 20 | X | X** | | 40 | 3.38 |
| 15 | | X** | | 45 | 3.76 |
| 20 | | X** | | 59 | 2.71 |
| 15 | X | | X | 52 | 2.56 |
| 20 | X | | X | 66 | 2.54 |
| 20 | | | X | 84 | 2.51 |
| 15 | | | X | 86 | 2.34 |

*speed of the mill - 11,000 rpm
**speed of the mill - 7,200 rpm

The process of the present invention appears also to be effective, in terms of enhancing component yields, when practiced on high protein wheat kernels. In the following Example V, the added step of flake disintegration prior to dough formation increases the gluten yields by about one-half based upon the yields attainable using flaking alone.

EXAMPLE V

High protein whole wheat kernels having an initial protein level of about 13-13.5% by weight were cleaned and maintained in a tempering tank containing room temperature water until the average moisture content reached about 19%. Following tempering the kernels were flaked in a conventional, smooth roll roller mill to a flake thickness in the range 0.0005 to 0.025 inches.

A portion of the flakes was hydrated by agitating with water and placed in a hydrating tank for about 30 minutes. A second portion of the flakes was pin milled and a third portion hammer milled to grind or crush the flakes to particles having a size distribution such that from 20 to 90% by weight would be retained on a 30 mesh U.S. Standard screen. The resulting milled particles were hydrated in the same manner as the flakes. Following hydration, the dough from each portion was water washed to separate and recover the starch, gluten and bran-germ components. The recovered components were dried and suitable measurements taken to determine % yield of each component calculated as weight of the component based upon the weight of the starting wheat kernels. The results are set forth in Table V.

TABLE V

| | % Yield | | |
| --- | --- | --- | --- |
| Milling | Gluten | Bran-Germ | Starch |
| Flaking | 8-8.5 | 20.0-22.0 | 48.0-50.0 |
| Flaking plus flake disintegration in pin mill | 12.9 | 18.9 | 55.4 |
| Flaking plus flake disintegration in hammer mill | 13.1 | 19.9 | 60.2 |

While the invention has been described with reference to particular embodiments thereof, it will be understood that numerous modifications may be made by those skilled in the art without actually departing from the scope of the invention. Accordingly, all modifications and equivalents may be resorted to which fall within the scope of the invention as claimed.

What is claimed is:

1. A process for fractionating the whole wheat kernel into its gluten and non-gluten endosperm components comprising the steps of:
   a. tempering whole wheat kernels in water to a moisture content, by weight, in the range from 14% to saturation;
   b. flaking the whole sheat kernels to a flake thickness in the range from 0.0005 to 0.025 inches;
   c. milling the flakes into primarily bran-germ and endosperm particles, and bran-germ particles being larger than said endosperm particles, and said bran-germ and endosperm particles having a size distribution such that 20 to 90% by weight of the particles are retained on a 30 mesh U.S. Standard screen;
   d. hydrating said particles in an additional quantity of water ranging from 65 to 85% by weight of said particles to be hydrated and in an amount just sufficient to achieve a saturation moisture content and agitating the particles and water to form a thick, dough-like mass;
   e. water washing a major proportion of said non-gluten endosperm components from said dough-like mass to leave a primarily gluten-containing agglomerate; and f. separating and recovering vital wheat gluten from said agglomerate.

2. A process, as claimed in claim 1, wherein said wheat kernels are tempered to a moisture content of from 14 to 22% by weight.

3. A process, as claimed in claim 2, wherein said wheat kernels are tempered to a moisture content of from 14 to 18% by weight.

4. A process, as claimed in claim 1, wherein said bran-germ and endosperm particles have a size distribution following milling such that 30–70% of the particles are retained on a 30 mesh screen.

5. A process, as claimed in claim 1, wherein said bran-germ and endosperm particles have a size distribution following milling such that 40–60% of the particles are retained on a 30 mesh screen.

6. A process, as claimed in claim 1, wherein said particles are hydrated by mixing said particles with water to form a dough, kneading said dough and permitting said hydrating water and particles to be associated in said dough for a time sufficient to substantially completely hydrate said particles.

7. A process, as claimed in claim 6, wherein said time sufficient to substantially completely hydrate said particles ranges from about 10 to 60 minutes.

8. A process, as claimed in claim 1, wherein said dough-like mass is gently tumbled during water washing of said non-gluten endosperm components therefrom.

9. A process, as claimed in claim 1, wherein said non-gluten endosperm components are retained in the wash water and are continuously transferred away from said dough-like mass.

10. A process, as claimed in claim 1, wherein said non-gluten endosperm components are retained in the wash water and are separated from the dough-like mass by filtration.

11. A process, as claimed in claim 10, wherein said non-gluten endosperm components are filtered from said dough-like mass in at least two separate stages.

12. A process, as claimed in claim 1, wherein said vital wheat gluten is separated from said agglomerate by mechanically manipulating said agglomerate while washing said agglomerate with water to wash said non-gluten components of said agglomerate away from said gluten.

13. A process, as claimed in claim 12, wherein siad non-gluten components of said agglomerate include starch and bran-germ.

14. A process as claimed in claim 13, wherein said bran-germ is separated from said agglomerate by abrading the agglomerate with a roughened surface.

15. A process, as claimed in claim 1, including the additional step of drying the gluten after separation thereof from said agglomerate.

16. A process, as claimed in claim 1, wherein said water for water washing said dough-like mass is at a temperature in the range 60°–90° F.

17. A process for fractionating the whole wheat kernal into its gluten, non-gluten endosperm and bran-germ components commmprising the steps of:

a. tempering whole wheat kernels in water having a temperature in the range from about room temperature to 120° F. to a moisture content, by weight, in the range from 14 to 22%;

b. flaking the whole wheat kernels to a flake thickness in the range from 0.0005 to 0.025 inches;

c. milling the flakes into primarily bran-germ and endosperm particles, said bran-germ particles being larger than said endosperm particles, and said bran-germ and endosperm particles having a size distribution such that 20 to 90% by weight of the particles are retained on a 30 mesh U.S. Standard screen;

d. hydrating said particles in an additional quantity of water ranging from 65 to 85% by weight of said particles to be hydrated and in an amount just sufficient to achieve a saturation moisture content to form a thick, dough-like mass, said hydrating comprising mixing said particles with water to form said dough, kneading said dough and permitting said hydrating water and particles to be associated in said dough for about 10–60 minutes;

e. separating a major proportion of said non-gluten endosperm components from said dough-like mass to leave a primarily gluten containing agglomerate by water washing said dough-like mass in water having a temperature in the range 60° to 120° F. while subjecting said mass to gentle tumbling, said non-gluten endosperm components being retained in the wash water and separated from said dough-like mass by filtration;

f. separating said vital wheat gluten from said agglomerate by mechanically manipulating said agglomerate while washing said agglomerate with water having a temperature in the range 60° to 120° F. to wash said non-gluten components of said agglomerate from said gluten, said mechanical manipulating including abrading the agglomerate with a roughened surface to separate said bran-germ therefrom.

18. In a process for fractionating the whole wheat kernel into its components including the steps of tempering the whole wheat kernels in water to a moisture content, by weight, in the range from 14% to saturation, milling the whole wheat kernels to flakes having a thickness in the range from 0.0005 to 0.025 inches, hydrating the milled kernels in an amount of water just sufficient to achieve a saturation moisture content to form a thick, dough-like mass, and separating the gluten and non-gluten kernel components from the dough-like mass, the improvement comprising milling said flakes prior to hydrating to disintegrate said flakes into primarily bran-germ and endosperm particles, said bran-germ particles being larger than said endosperm particles, and said bran-germ and endosperm particles having a size distribution such that 20 to 90% by weight of the particles are retained on a 30 mesh U.S. Standard screen.

19. A process, as claimed in claim 18, wherein said bran-germ and endosperm particles have a size distribution following flake disintegration such that 30–70% of the particles are retained on a 30 mesh screen.

* * * * *